Oct. 9, 1951                N. C. PRICE                2,570,591
FUEL CONTROL SYSTEM FOR TURBO POWER PLANTS
Original Filed March 6, 1942                2 Sheets-Sheet 1
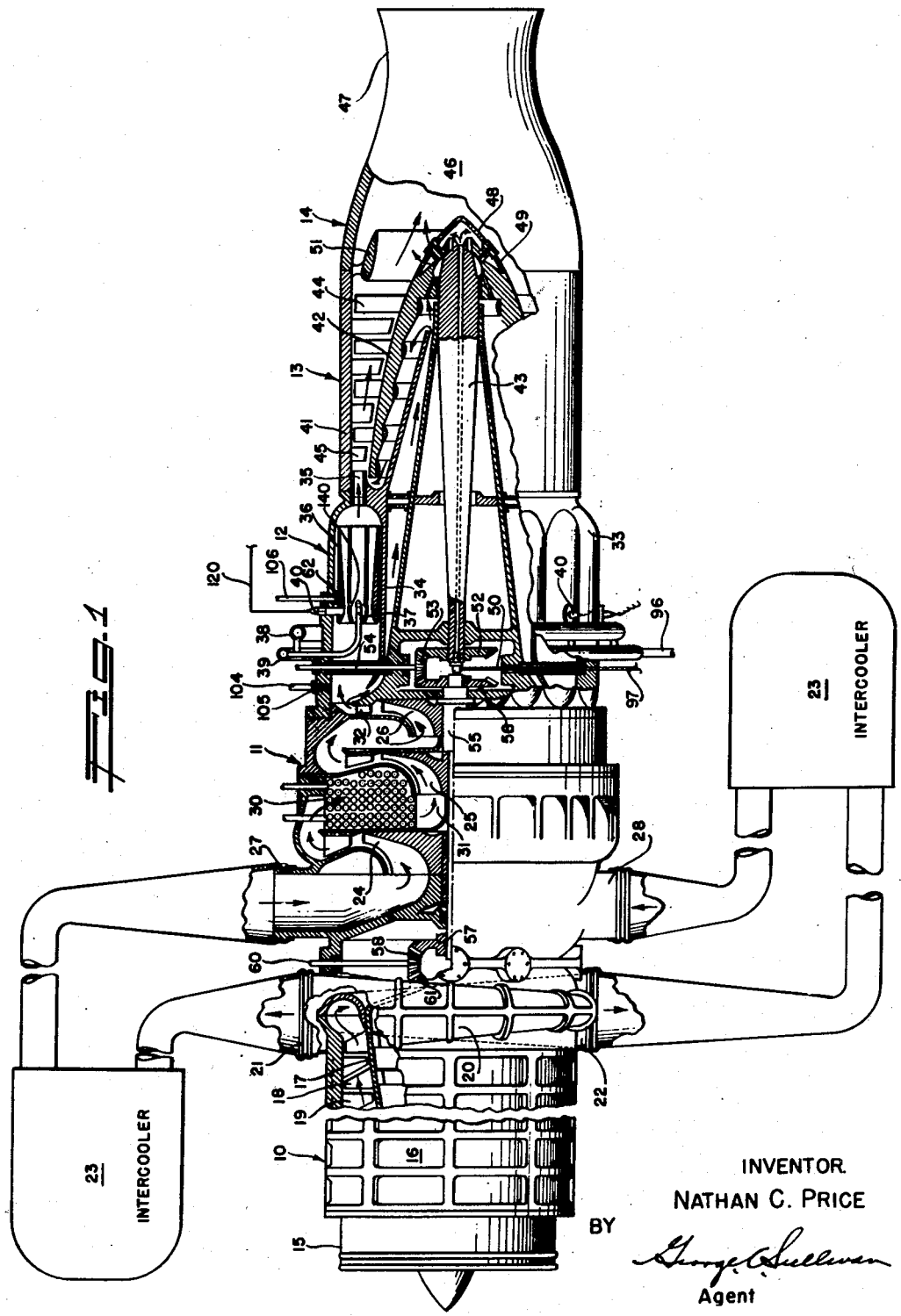
INVENTOR.
NATHAN C. PRICE
BY
Agent

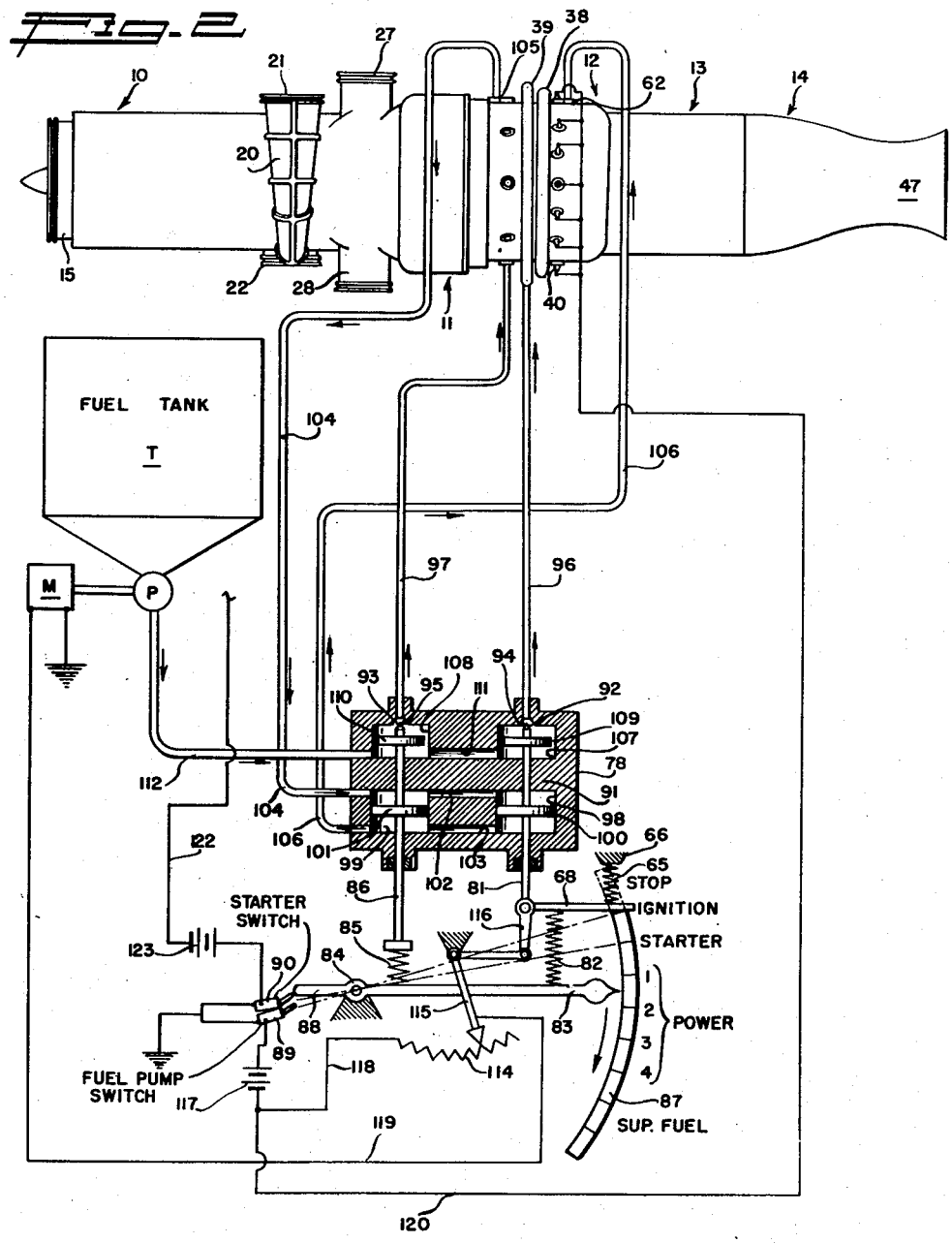

Patented Oct. 9, 1951

2,570,591

UNITED STATES PATENT OFFICE 2,570,591

FUEL CONTROL SYSTEM FOR TURBO POWER PLANTS

Nathan C. Price, Los Angeles, Calif., assignor to Lockheed Aircraft Corporation, Burbank, Calif.

Application September 8, 1945, Serial No. 615,167, which is a division of application Serial No. 433,599, March 6, 1942, now Patent No. 2,540,991, dated February 6, 1951. Divided and this application April 26, 1947, Serial No. 744,238

17 Claims. (Cl. 60—35.6)

1

This invention relates to internal combustion powerplants and relates more particularly to fuel control systems for internal combustion turbine powerplants. The mechanism or system of the present invention is intended primarily for embodiment in internal combustion turbo powerplants employed to propel aircraft and other high velocity vehicles.

This application is a division of my co-pending application, Serial No. 615,167, filed September 8, 1945, which in turn is a division of my co-pending application Serial No. 433,599, filed March 6, 1942, now Patent No. 2,540,991.

It is a general object of the present invention to provide a practical, efficient and dependable fuel supply and control system for internal combustion turbine powerplants which system automatically establishes and maintains an efficient air-fuel mixture in the combustion chamber or chambers of the powerplant under all conditions of powerplant operation.

Another object of the invention is to provide a fuel control system of the character referred to in which the pump driving motor is associated with the manually operable throttle control lever, or the equivalent, in such a manner that the fuel pressure supplied to the fuel distributing system is directly related to the fuel quantity requirements at the various powerplant speeds. The power input to the pump driving motor is controlled or adjusted by the throttle control lever so that the speed of the pump is directly controlled according to the fuel quantity requirements. This results in the conservation of power required for driving the pump and prevents fuel vapor lock due to frictional overheating of the fuel lines, etc.

Another object of the invention is to provide a fuel control system embodying a fuel metering means interposed between the fuel pump and the fuel injection nozzles which metering means automatically operates to meter the fuel in accordance with the air flow through the combustion zone. The metering means is responsive to the combined function of the rates of flow of air and fuel to the combustion zone and tends to maintain a proper efficient fuel-air ratio for each power control setting.

A further object of the invention is to provide a fuel control system of the class referred to which incorporates fuel metering means for the primary combustion zone and the secondary or supplemental combustion zone which function in a sequence relation to meter the fuel to both zones. The metering means for the fuel supplied

2 to the supplemental combustion zone is subject to the same regulation as the primary fuel metering device and the aggregate quantity of fuel supplied to the two combustion zones does not exceed the optimum fuel burning capacity of the plant or subject the powerplant elements to excessive temperatures.

Other objects and features of the invention will become apparent from the following detailed description of a typical preferred embodiment, throughout which description reference will be made to the accompanying drawings, in which:

Figure 1 is a side elevation of a powerplant in which the fuel control system of the invention is embodied, with a major portion broken away to appear in longitudinal cross-section; and Figure 2 is a diagrammatic view of the fuel system associated with the powerplant.

The fuel control system of the present invention is suitable for embodiment in internal combustion turbo powerplants varying considerably in design and intended application and, of course, may be modified somewhat to adapt it to given installations. In the following disclosure I will describe the system of the invention in connection with a gas turbine reactive propulsion powerplant of the class disclosed in my co-pending applications referred to above. The general structure of the powerplant is briefly described because the fuel control system is intimately related with the several powerplant elements and mechanisms. However, the specific details of the powerplant are omitted as not being essential to an understanding of the invention.

The powerplant is adapted for use in propelling high speed, high altitude aircraft and is designed to handle a substantial volumetric air flow. The plant comprises generally first and second stage compressors 10 and 11, a primary combustion chamber 12, a gas turbine 13, and a secondary combustion chamber 14.

The first stage compressor 10 is of the axial flow type and is equipped at its forward end with a tubular spigot 15 which faces forwardly relative to the direction of flight of the aircraft so as to receive the rammed air. The compressor 10 includes a tubular housing 16 and a rotor 17 supported for rotation in the housing. The rotor carries a plurality of stages or rows of impeller blades 18 and rows of diffuser vanes 19 are provided on the housing 16 to extend between the impeller blades. The rear or exhaust end of the compressor 10 terminates at a double scroll outlet housing 20 having a pair of outlet spigots 21 and 22 which communicate with intercoolers 23.

The second stage compressor 11 is of the multi-stage radial flow type and comprises three stages 24, 25 and 26 of centrifugal compression arranged in series or tandem relation. The first stage centrifugal compressor 24 is at the rear of the scroll housing 20 and has two spigots 27 and 28 receiving the first stage compressed air from the intercoolers 23. The annular exhaust duct of the compressor 24 directs the compressed air through a liquid fed intercooler 30 which, in turn, delivers the air to the inlet 31 of the second stage of centrifugal compression. The second and third stage centrifugal compressors 25 and 26 are directly connected in tandem and the air from the final stage compressor passes through diffuser vanes 32 to the combustion chamber 12.

The combustion chamber 12 comprises a housing 33 and an annular shroud 34 which together define an annular space leading from the exhaust of the final stage compressor 26 to the nozzle ring 35 of the gas turbine 13. The housing 33 and shroud 34 are shaped to have an annular series of parallel pockets for containing pairs of concentric burner tubes 36. The concentric tubes 36 are spaced apart to leave annular combustion spaces which are substantially Venturi shaped to have somewhat confined zones. Radial openings 140 pass through the walls of the inner tubes 36 at said zones. Fuel injection nozzles 37 extend into the forward ends of the innermost burner tubes 36 and are supplied with compressed air and fuel by annular supply manifolds 38 and 39. The nozzles 37 discharge the fuel-air mixture laterally through said openings 140 into the above mentioned annular Venturi shaped passages. Electrical resistance glow plugs 40 extend into the Venturi shaped passages of the combustion chamber 12 to ignite the fuel and air mixture.

The gas turbine 13 which is driven by the expanding gases of combustion and air issuing from the combustion chamber 12 includes a housing 41 which extends rearwardly from the combustion chamber. A rotor 42 is fixed to a central shaft 43 and rotates within the housing. Impeller buckets or blades 44 on the rotor 42 operate between rows of stator blades 45 on the interior of the housing 41. The nozzle ring 35 discharges the gases of combustion from the combustion chamber 12 into the expansion zone of the turbine to drive the rotor 42.

The secondary combustion chamber 14 is defined by a tubular wall or casing 46 which extends rearwardly from the turbine casing 41. The casing 46 is of rearwardly diminishing diameter and its rear end carries a propulsive jet forming nozzle 47. In accordance with the invention supplemental fuel is injected into the secondary combustion chamber 14 when additional power is desired. The means for injecting the supplemental fuel includes a cap 48 on the apex of the turbine rotor and provided with divergent fuel injecting orifices 49. The rotor shaft 43 is tubular and conducts the fuel from an elbow fitting 50 to the hollow cap 48. The supplemental fuel injected from the orifices 49 burns in the excess air leaving the turbine 13 to materially increase the thrust output of the powerplant. An internal annular baffle 51 of streamlined cross section is supported in the supplemental combustion chamber to surround and directly oppose the series of fuel injecting orifices 49.

The turbine 13 drives the compressors 10 and 11 through the medium of gear drives or transmissions. A beveled gear 52 is fixed on the forward end of the rotor shaft 43 and meshes with beveled pinions 53 which are splined to radial auxiliary shafts 54. The compound radial flow compressor 11 has a shaft 55 and a beveled gear 56 is fixed on this shaft to mesh with the pinions 53. It will be seen how the compressor shaft 55 is driven counter to the turbine rotor 42 by the gearing just described. The compressor shaft 55 in turn drives the first stage compressor 10 through the medium of a suitable transmission which may include a beveled gear 57 fixed on the forward end of the shaft to mesh with pinions 58. The pinions 58 are fixed on radial shafts 60 which may project from the powerplant housing to drive auxiliaries. The end wall of the first stage rotor 17 carries a beveled gear 61 which is in mesh with the pinions 58 so that the first stage compressor is driven by the gearing.

The fuel control system of the invention includes a fuel valve housing 78 containing valves for the primary and secondary fuel injection and cylinder and piston means for operating the same. See Figure 2. A lever 68 is positioned below the valve housing 78 and one end of the lever is pivotally connected with a piston rod 81 projecting from the valve housing 78. A spring 65 is arranged under compression between the other end of the lever 68 and a relatively stationary abutment 66. A coil spring 82 serves as an elastic connection between an intermediate point on the lever 68 and a control lever 83. The spring 65 serves as an elastic fulcrum for the lever 68 and allows the angle of the lever to change without imposing bending forces on the piston rod. The throttle control lever 83 may be located in the flight compartment so as to be conveniently manually operated by the pilot or flight engineer. In case the control station for the pilot or flight engineer is remote from the powerplant control auxiliaries, the lever 83 may be actuated through suitable linkages or cables not shown. The throttle control lever 83 is pivotally supported at 84 on a suitable portion of the aircraft structure.

A second coil spring 85 normally acts under compression between a secondary fuel valve piston rod 86 and a point on the control lever 83 intermediate its fulcrum 84 and the first coil spring 82. The piston rod 86 is parallel with the above mentioned rod 81 and enters the valve housing 78. The free or outer arm of the throttle lever 83 is adapted to move across a suitably calibrated sector 87. The opposite or fulcrum end of the lever 83 has an arm 88 which is adapted to actuate an ignition and fuel pump switch 89 and then actuate a starter switch 90 when the lever is moved across the sector 87 in the direction indicated by the arrow in Figure 2.

The above mentioned primary and secondary fuel valve piston rods 81 and 86 pass through suitable stuffing boxes to enter the valve housing 78, and the two rods are slidably guided in openings in an intermediate partition or wall 91. The rods 81 and 86 have gas-tight and liquid-tight sliding engagement in the openings. The inner ends of the rods 81 and 86 have needle points 92 and 93 respectively which are adapted to seat on correspondingly beveled outlet valve seats 94 and 95 when in the closed positions. Outflow fuel pipes 96 and 97 extend from the seats 94 and 95 to the powerplant fuel injection systems.

The valve housing 78 has a pair of cylinder bores 98 and 99 and the piston rods 81 and 86 carry pistons 100 and 101 which have sliding fluid tight fits in the bores. The cylinder bores 97 and 99 are formed in the lower portion of the valve housing and the respective upper and lower ends of the bores are interconnected by ducts 102 and 103. An air pressure pipe 104 leads from the discharge of the final stage compressor 26 to the upper ends of the interconnected cylinder bores. An inlet nipple 105 may extend through the combustion chamber housing 33 to place the pipe 104 in communication with the high pressure air duct leading to the combustion chamber. A vacuum pipe 106 leads from the lower ends of the interconnected cylinder bores 98 and 99 to a Venturi section of a burner tube 36. This is shown at 62 in Figure 1. It will be seen that the pipes and connections just described operate to provide differential pressures on the opposite sides of the pistons 100 and 101.

A pair of cylinder bores 107 and 108 is formed in the upper portion of the valve housing 78 above the wall 91. The above mentioned piston rods 81 and 86 extend through the bores 107 and 108 and carry pistons 109 and 110 respectively which have loose sliding fits in their respective cylinder bores. A duct 111 in the housing 78 interconnects the lower ends of the cylinder bores 107 and 108 and a fuel supply pipe 112 extends from the duct 111 to a fuel feed pump P. The pump P in turn has its suction or low pressure side in direct communication with the bottom of a fuel storage tank T to avoid the possibility of a suction line vapor lock. The upper ends of the cylinder bores 107 and 108 are provided with the above described needle valve seats 94 and 95 respectively which, in turn, communicate with the fuel delivery pipes 96 and 97. The pipe 96 carries the fuel to the manifold 39 of the primary combustion chamber and the pipe 97 carries fuel to the combustion chamber housing 33 where it passes to the tubular rotor shaft 43 for ultimate discharge from the supplemental fuel orifices 49.

The invention includes an actuating and control circuit for the fuel pump P. The pump P is driven by an electric motor M and the invention includes a system for varying the electrical input to the motor in accordance with the throttle setting and the fuel demand of the power plant. A rheostat 114 is arranged to be actuated by the piston rod 81 and lever 68. The rheostat 114 may have a common support with the fuel valve housing and includes a pivoted contact arm 115. The arm 115 is actuated by a link 116 interconnecting the lower end of the piston rod 81 and a crank secured on the arm 115. Movement of the arm 115 controls or varies a circuit completed through the snap switch 89, a battery 117, a conductor 118, the resistance of the rheostat 114, and a conductor 119 to the motor M. The return of the circuit is by way of the ground connections illustrated. It will be seen that the electrical power input to the fuel pump drive is adapted to be varied as a function of the throttle lever setting and the fuel demands of the power plant. A parallel circuit is completed through the glow plugs 40 by the switch 89 from the battery 117 through a conductor 120 and back through the ground connections.

The above mentioned switch 90 controls a circuit including a conductor 122 and a source of electrical energy 123 which circuit in turn controls a system for starting the power plant. A description of the starting system is omitted from this disclosure because it is not essential to an understanding of the present invention. The starting system may be of the class disclosed and claimed in my co-pending application Serial No. 615,167, filed September 8, 1945.

In the operation of the apparatus it will first be assumed that the throttle lever 83 is moved along the sector 87 from the stop position to the position designated ignition. The movement of the lever 83 causes actuation of the switch 89 to complete a low voltage circuit through the glow plugs 40. At the same time the circuit to the fuel pump motor M is also closed by the same switch. At this ignition position of the throttle lever 83, there is a maximum of rheostat resistance in the motor circuit and, therefore, a minimum of power input to the fuel pump P. Under these conditions the pump P produces a comparatively small fuel pressure. When the glow plugs 40 have reached a fuel igniting temperature, and the fuel pressure has come up to the starting pressure, the lever 83 is advanced to the starter position. This actuates the switch 90 to complete the circuit to the starting system and the power plant is started. When the compressors 10 and 11 and the turbine 13 are up to about 15% of their normal speed, sufficient air is supplied by the compressors to establish an appreciable differential pressure in the pipes 104 and 106. This pressure differential is communicated to the fuel valve actuating pistons 100 and 101 in the cylinders 98 and 99, and tends to move the fuel control needle valves downwardly off their seats 94 and 95. When the throttle control lever 83 is at the starter position on the sector 87, the spring 85 is under sufficient compression to hold the needle valve 93 of the piston rod 86 firmly closed but the compression in the spring 82 is at this point so balanced that as soon as the flow of air through the burner tubes is established to a given value during the starting cycle the above mentioned resultant differential pressures acting on the piston 100 is sufficient to crack or slightly open the needle valve 92 of stem 81 and allow a proper amount of the fuel to flow through line 96 to the primary fuel jet manifold 39 and thence to the spray jets 37 in the burner tubes. This initiates operation of the power plant and the power plant is brought up to the idling speed.

Upon a further advance of the control lever 83 from the starter position the compressive force of the spring 82 is further relaxed, tending to allow the primary fuel needle valve 92 to open further and to feed a greater quantity of fuel to the burner jets. However, regulatory forces are immediately and automatically superimposed upon the fuel control valve motion to meter the fuel allowed to flow to the burner jets in accordance with the quantity of flow of air through the combustion zone. This insures a proper and efficient fuel mixture to produce a nearly constant combustion temperature, thereby protecting the gas turbine from thermal damage. These regulatory forces are applied to the needle valve stems. For example, the primary fuel valve stem 81 is urged in a direction to re-close the needle valve 92 by the friction of the increased flow of fuel upwardly around the piston 109 and the force applied to the piston 109 through the pipe 104 tends to move the needle valve to an open position. The force applied to the piston 109 is thus opposed to that applied to the piston 100 and tends to return the needle valve 92 to a closed position upon the flow of fuel through the cylinders. This force is caused by the differential pressure imposed upon the piston 109 by the frictional flow of fuel through the small clearance space between the piston and the cylinder wall and toward the valve outlet 94. The flow of fuel from the primary fuel valve is thus a modified combined function of the rates of flow of fuel and air to the combustion zone which tends under all conditions to maintain a proper fuel-air ratio for any given power control setting, assuming a substantially constant fuel viscosity.

Up to this point in the initial stages of operation of the power plant the supplemental fuel needle valve stem 86 has remained in its closed position against the seat 95 under the compressive force of the spring 85. When the control lever is still further advanced on the sector 87 and approaches the position marked "Supplemental Fuel," the spring 85 reaches a state of elongation where its compressive force is reduced to a value which permits the supplemental fuel needle metering valve 93 to lift off its seat 95. This allows supplemental fuel to flow through the line 97 and the tubular rotor shaft to the supplemental fuel orifices 49 in the apex 48 of the gas turbine rotor. Supplementary fuel is thus sprayed into the secondary combustion chamber 14 where it burns in the presence of the excess air carried in the gas turbine exhaust. Still further advance of the control lever results in further opening of the supplemental fuel valve 93 to supply an added quantity of fuel to the secondary combustion zone. The metering of the supplementary fuel is subject to the same automatic regulation as that before described in connection with the primary metering valve. As a result the total final quantity of fuel, both primary and supplementary, does not exceed that required for the burning of all of the air leaving the gas turbine. This avoids the loss of raw fuel through the propulsive nozzle of the powerplant.

During the above described forward advancements of the control lever 83 the rheostat 114 is actuated through its associated linkage to progressively decrease its resistance and thus increase the power input to the motor M which drives the fuel pump P. Accordingly the fuel pressure delivered to the metering valve mechanism varies as an approximate function of the demand. The needle valves of the metering means do not in fact appreciably throttle the fuel but rather the fuel pump speed is directly controlled at the fuel pressure source according to the fuel quantity requirements and the combustion air back pressure. The needles 92 and 93 regulate or "trim" the flow to the exact quantities required with only a small throttling action. This conserves electric power and prevents fuel vapor lock due to frictional overheating. Furthermore, the fuel pressure system makes possible the use of small fuel lines because the fuel pressure drop in the line is compensated for by the fuel control system. Thus a further controlling factor is combined with the automatic characteristics of the fuel metering valve mechanism and tends to impart automatic regulatory characteristics to the unit as a whole.

For example, in the event the control lever 83 is moved forward suddenly an immediate increase in fuel pressure with a momentary corresponding increase in flow to the burner results. This momentary increase in flow of the fuel takes care of the acceleration and increased primary and supplementary fuel requirements of the power unit under high power output conditions.

Having thus described my invention and the present preferred embodiments thereof, I desire to emphasize the fact that many modifications may be resorted to in a manner limited only by a just interpretation of the following claims.

I claim:

1. A power plant comprising a compressor, a gas turbine driving the compressor, a primary combustion chamber between the turbine and compressor, a secondary combustion chamber at the downstream side of the turbine, fuel injection means for the primary combustion chamber, fuel injection means for the secondary combustion chamber, a source of fuel under pressure, means responsive to pressure conditions in the compressor and primary combustion chamber for metering the delivery of fuel from said source to the primary combustion chamber, means responsive to pressure conditions in the compressor and primary combustion chamber for metering the delivery of fuel from said source to the secondary combustion chamber, and a control operable to sequentially operate said metering means so that a given fuel-air ratio is first established in the primary combustion chamber and subsequently a given fuel-air ratio is established in the secondary combustion chamber.

2. A power plant comprising a compressor, a gas turbine driving the compressor, a primary combustion chamber between the turbine and compressor, a secondary combustion chamber at the downstream side of the turbine, fuel injection means for the primary combustion chamber, fuel injection means for the secondary combustion chamber, a source of fuel under pressure, means sensitive to fuel flow to the primary chamber and to air pressure conditions in the compressor and primary combustion chamber for metering the delivery of fuel from said source to the injection means of the primary chamber, means sensitive to fuel flow to the secondary chamber and to air pressure conditions in the compressor and primary combustion chamber for metering the delivery of fuel from said source to the injection means of the secondary chamber, and a single manual control for sequentially conditioning said metering means for operation.

3. A gas turbine power plant comprising a compressor, a turbine, a combustion chamber between the compressor and turbine, a source of fuel, a pump for pumping fuel under pressure from said source to the combustion chamber for injection therein, variable speed power means for operating the pump, metering means between the pump and combustion chamber sensitive to fuel flow pressure and to the rate of air flow from the compressor and operable to effect a fine regulation of fuel flow to the combustion chamber, and means for varying the speed of operation of the power means to effect the primary regulation of fuel delivery to the combustion chamber.

4. A gas turbine power plant comprising a compressor, a turbine, a combustion chamber between the compressor and turbine, a source of fuel, a variable output pump means for pumping the fuel to the combustion chamber, means interposed between the pump means and combustion chamber sensitive to fuel flow pressure and to the rate of air flow into the combustion chamber to effect a fine regulation of the fuel flow to the combustion chamber, and manually operable means for varying the speed of operation of the pump means to effect a primary regulation of fuel delivery to the combustion chamber.

5. A gas turbine power plant comprising a compressor, a turbine, a combustion chamber between the compressor and turbine, a source of fuel, a variable output pump for pumping the fuel to the combustion chamber, means interposed between the pump and combustion chamber sensitive to fuel flow pressure and to the rate of air flow from the compressor to effect a fine regulation of the fuel flow to the combustion chamber, primary control means for varying the speed of operation of the pump to effect the primary regulation of fuel delivery to the combustion chamber, and manually operable means for actuating the primary control means and for biasing said fine regulation means.

6. A gas turbine power plant comprising a compressor, a turbine, a combustion chamber between the compressor and turbine, a source of fuel, a variable output pump for pumping the fuel to the combustion chamber, means interposed between the pump and combustion chamber sensitive to fuel flow pressure and to the rate of air flow into the combustion chamber to effect a fine regulation of the fuel flow to the combustion chamber, a primary control means for varying the speed of operation of the pump to effect the primary regulation of fuel delivery to the combustion chamber, and a single manual control for simultaneously operating the primary control means and biasing said fine regulation means.

7. A gas turbine power plant comprising a compressor, a gas turbine, a combustion chamber between the compressor and turbine, a pump for pumping fuel into the combustion chamber, variable power means for operating the pump, fuel metering means interposed between the pump and the combustion chamber including a fuel metering valve, a piston associated with the valve and acted upon by the fuel flowing to the combustion chamber to urge the valve closed, and a manually operable throttle control for simultaneously varying the output of said power means and the position of the valve.

8. A gas turbine power plant comprising a compressor, a gas turbine, a combustion chamber between the compressor and turbine, a pump for pumping fuel into the combustion chamber, variable power means for operating the pump, fuel metering means interposed between the pump and the combustion chamber including a fuel metering valve, a piston associated with the valve, means for applying pressure from the compressor to one side of the piston, means for supplying pressure from the combustion chamber to the other side of the piston, the differential in said pressures tending to operate the metering valve, and a manually operable control for varying the output of said power means and the position of the valve.

9. A gas turbine power plant comprising a compressor, a gas turbine, a combustion chamber between the compressor and turbine, a pump for pumping fuel into the combustion chamber, variable power means for operating the pump, fuel metering means interposed between the pump and the combustion chamber including a fuel metering valve, a piston associated with the valve and acted upon by the fuel flowing to the combustion chamber to urge the valve closed, a second piston associated with said valve, means for supplying pressure from the compressor to one side of the second piston, means for supplying pressure from the combustion chamber to the other side of the second piston, the differential in said pressures tending to operate the metering valve, and a manually operable throttle control for simultaneously varying the output of said power means and the position of the valve.

10. A gas turbine power plant comprising a compressor, a gas turbine, a primary combustion chamber between the compressor and turbine, a secondary combustion chamber, a pump for pumping fuel to said chambers, variable power means for driving the pump, a fuel metering means interposed between the pump and each of said chambers, each metering means including a fuel metering valve, and a piston associated with the valve acted upon by the fuel flowing to the respective chamber to urge the valve closed, and manual means for sequentially operating said valves and for varying the output of said power means.

11. A gas turbine power plant comprising a compressor, a gas turbine, a primary combustion chamber between the compressor and turbine, a secondary combustion chamber, a pump for pumping fuel to said chambers, variable power means for driving the pump, a fuel metering means interposed between the pump and each of said chambers, each metering means including a fuel metering valve, a first piston associated with the valve and acted upon by the fuel flowing to the respective combustion chamber to urge the valve closed, a second piston associated with the valve, means for supplying pressure from the compressor to one side of the second piston, and means for supplying pressure from the combustion chamber to the other side of the second piston, the differential in said pressures tending to operate the valve, and manually operable means for simultaneously varying the output of said power means and sequentially operating said valves.

12. A gas turbine power plant comprising a compressor, a gas turbine, a primary combustion chamber between the compressor and turbine, a supplemental combustion chamber at the downstream side of the turbine, a single pump for pumping fuel to said chambers, a first fuel metering valve means interposed between the pump and the primary chamber, a second fuel metering valve means interposed between the pump and the supplemental chamber means for dividing the fuel flow from the pump into separate streams for flow through said separate valve means, a single manual control lever, and operative connections between the lever and said metering valve means related so that the metering valve means are operated in sequence upon movement of the lever.

13. A gas turbine power plant comprising a compressor, a gas turbine, a primary combustion chamber between the compressor and turbine, a supplemental combustion chamber at the downstream side of the turbine, a pump for pumping fuel to said chambers, a first fuel metering means interposed between the pump and the primary chamber, a second fuel metering means interposed between the pump and the supplemental chamber, a manual control lever, and elastic means connected between the lever and said metering means related so that the metering means are operated in sequence upon movement of the lever.

14. A gas turbine power plant comprising a compressor, a gas turbine, a primary combustion chamber between the compressor and turbine, a supplemental combustion chamber at the downstream side of the turbine, a pump for pumping fuel to said chambers, a first fuel metering means interposed between the pump and the primary chamber, a second fuel metering means interposed between the pump and the supplemental chamber, a manual control lever, and compression springs engaged between the lever and said metering means related so that the metering means are operated in sequence upon movement of the lever.

15. A gas turbine power plant comprising a compressor, a gas turbine, a primary combustion chamber between the compressor and turbine, a supplemental combustion chamber at the downstream side of the turbine, a pump for pumping fuel to said chambers, a first fuel metering means interposed between the pump and the primary chamber, a second fuel metering means interposed between the pump and the supplemental chamber, a manual control lever, elastic operative connections between the lever and said metering means operable to produce sequential operation of the metering means upon movement of the lever, and a calibrated sector associated with the lever for indicating the operative condition of the two metering means.

16. In a gas reaction propulsive unit, apparatus comprising in combination, a flow system for air and gases including a gas turbine, a nozzle communicating with the exhaust of said turbine and adapted to produce a propulsive jet, primary and secondary combustion chambers, the primary combustion chamber including an air and fuel mixing region having a high velocity throat, means to introduce combustion gases from said primary combustion chamber into said turbine, means to pass combustion gases from said turbine into said secondary combustion chamber and the said nozzle, a compressor driven by said turbine, and means to pass compressed air from said compressor to said primary combustion chamber; means to introduce fuel to said primary combustion chamber; means to introduce fuel into said secondary combustion chamber; a manually settable fuel throttle control; and means responsive to the combined functions of the rate of flow of compressed air into said primary combustion chamber measured by the differential between the pressure in said compressor and the pressure in said throat of the primary combustion chamber and the throttle control setting to meter the rate of said introduction of said fuel into the primary and secondary combustion chambers.

17. Apparatus according to claim 16 in which said means to meter fuel includes a primary metering valve for metering fuel for the primary combustion chamber and a secondary metering valve for metering fuel for the secondary combustion chamber operable successively first to control the introduction of fuel into the primary combustion chamber only, and subsequently to control introduction of fuel into both the primary and secondary combustion chambers.

NATHAN C. PRICE.

REFERENCES CITED

The following references are of record in the file of this patent:

UNITED STATES PATENTS

| Number | Name | Date |
|---|---|---|
| 1,052,588 | Janicki | Feb. 11, 1913 |
| 2,004,869 | Hogg | June 11, 1935 |
| 2,238,905 | Lysholm | Apr. 22, 1941 |
| 2,280,835 | Lysholm | Apr. 28, 1942 |
| 2,316,327 | Garretson | Apr. 13, 1943 |
| 2,348,113 | Davis | May 2, 1944 |
| 2,369,665 | Gosslau | Feb. 20, 1945 |

FOREIGN PATENTS

| Number | Country | Date |
|---|---|---|
| 865,115 | France | Feb. 10, 1941 |

OTHER REFERENCES

Flight, issue of October 9, 1941, pages 239 and 242.